United States Patent [19]

Tom et al.

[11] Patent Number: 5,057,242
[45] Date of Patent: Oct. 15, 1991

[54] COMPOSITION, PROCESS, AND APPARATUS, FOR REMOVAL OF WATER AND SILICON MU-OXIDES FROM CHLOROSILANES

[75] Inventors: Glenn M. Tom, New Milford; James V. McManus, Danbury, both of Conn.

[73] Assignee: Novapure Corporation, Danbury, Conn.

[21] Appl. No.: 323,302

[22] Filed: Mar. 14, 1989

Related U.S. Application Data

[63] Continuation-in-part of Ser. No. 29,631, Mar. 24, 1987, Pat. No. 4,853,148.

[51] Int. Cl.$^5$ .................. C09K 3/00; C07F 7/08
[52] U.S. Cl. .................. 252/194; 423/210; 556/466; 502/415; 502/152; 502/157; 502/407; 502/402
[58] Field of Search ............ 423/210; 252/194; 556/466; 502/415, 152, 157, 407, 402

[56] References Cited

U.S. PATENT DOCUMENTS

| 29,631 | 3/1987 | Tom. | |
|---|---|---|---|
| 2,902,507 | 9/1959 | Hyde | 556/466 |
| 4,127,598 | 11/1978 | McEntee | 556/466 |
| 4,297,500 | 10/1981 | Finke et al. | 556/466 |
| 4,604,270 | 8/1986 | Tom | 423/262 |
| 4,723,967 | 2/1988 | Tom | 55/36 |
| 4,738,693 | 4/1988 | Tom | 55/36 |
| 4,774,347 | 9/1988 | Marko et al. | 556/466 |

FOREIGN PATENT DOCUMENTS

| 10774 | 5/1984 | European Pat. Off. . |
| 61-1197415 | 1/1986 | Japan . |
| 61-48420 | 3/1986 | Japan . |
| 61-67693 | 9/1986 | Japan . |

Primary Examiner—Deborah L. Kyle
Assistant Examiner—Valerie Fee
Attorney, Agent, or Firm—Steven J. Hultquist

[57] ABSTRACT

A scavenger composition having utility for removal of water and silicon mu-oxide impurities from chlorosilanes, such scavenger composition comprising:

(a) a support; and
(b) associated with the support, one or more compound(s) selected from the group consisting of compounds of the formula:

$$R_{a-x}MCl_x$$

wherein:
M is a metal selected from the group consisting of the monovalent metals lithium, sodium, and potassium; the divalent metals magnesium, strontium, barium, and calcium; and the trivalent metal aluminum;
R is alkyl;
a is a number equal to the valency of metal M; and
x is a number having a value from 0 to a, inclusive; and wherein said compound(s) of the formula $R_{a-x}MCl_x$ have been activated for impurity-removal service by a reaction scheme selected from those of the group consisting of:
(i) reaction of such compound(s) with hydrogen chloride to form a first reaction product therefrom, followed by reaction of the first reaction product with a chlorosilane of the formula:

$$SiH_{4-y}Cl_y,$$

wherein y is a number having a value of from 1 to 3, inclusive; and
(ii) reaction of such compound(s) with a chlorosilane of the formula:

$$SiH_{4-y}Cl_y$$

wherein y is a number having a value of 1 to 3, inclusive. A corresponding method of making the scavenger composition, and of purifying a chlorosilane which contains oxygen and silicon mu-oxide impurities, likewise are disclosed, together with a purifier apparatus, in which a bed of the scavenger composition is disposed. The composition, purification process, and purifier apparatus of the invention have utility in purifying gaseous chlorosilanes which are employed in the semiconductor industry as silicon source reagents for forming epitaxial silicon layers.

9 Claims, 2 Drawing Sheets

COMPOSITION, PROCESS, AND APPARATUS, FOR REMOVAL OF WATER AND SILICON MU-OXIDES FROM CHLOROSILANES

CROSS REFERENCE TO RELATED APPLICATION

This application is a continuation-in-part of U.S. Ser. No. 07/029,631 filed Mar. 24, 1987 in the names of G. M. Tom, et al and entitled "PROCESS AND COMPOSITION FOR DRYING OF GASEOUS HYDROGEN HALIDES", issued Aug. 1, 1989 as U.S. Pat. No. 4,853,148.

BACKGROUND OF THE INVENTION

1. Field of The Invention

This invention relates generally to a composition, process, and apparatus, for removing water and mu-oxides of silicon from chlorosilanes.

2. Description of The Related Art

In the manufacture of semiconducting materials and semiconductor devices, dichlorosilane ($SiH_2Cl_2$) is widely employed as a silicon source reagent compound for the production of epitaxial silicon films.

In such usage, the gaseous dichlorosilane compound is required to be of high purity, since the presence of contaminants or impurity species therein can render the product semiconductor deficient or even useless for its intended purpose.

Unfortunately, however, dichlorosilane as commercially supplied is characterized by the presence of impurities such as water and various silicon mu-oxides therein. Such impurities must therefore be removed prior to usable of the gaseous dichlorosilane in the semiconductor plant.

The silicon mu-oxide impurities in dichlorosilane may for example include compounds of the formula $(SiH_xCl_{3-x})_2O$ wherein x is a number having a value of from 0 to 3, inclusive, as well as silicon mu-oxide compounds of other stoichiometries, including cyclic, compounds. Some illustrative silicon mu-oxide compounds, which may be present in dichlorosilane as impurities, are set out below with respect to their formulae:

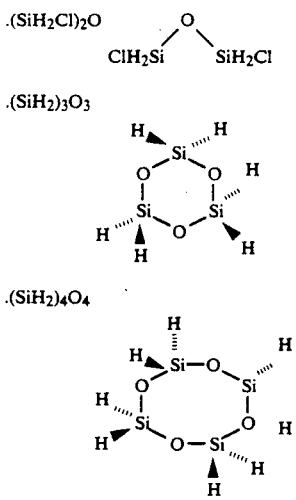

The art has proposed to purify dichlorosilane of such impurities by contacting the impurity-containing dichlorosilane with various sorbent materials such as silicas, zeolites, and aluminosilicates. Illustrative of such prior art approaches are the methods and purification materials described in the following patent publications: R. S. Doornbos, "Purification of Chlorosilanes.," European Patent Application EP 107784 A1, May 9, 1984; K. Kawasaki and Y. Kitsuno, "Purification of Silane," Japanese Kokai Tokkyo Koho JP 61/48420 [86/48420], Mar. 10, 1986; T. Sugimoto, T. Murayama, and Y. Suzuki, "Purification of Dichlorosilane." Japanese Kokai Tokkyo Koho JP 61/167693A2 [86/167693], July 29, 1986; and T. Sugimoto, T. Murayama, and Y. Suzuki, "Purification of Dichlorosilane," Japan Kohai Tokkyo Koho JP 61/197415A2 [86/197415], Sept. 1, 1986. These methods and purification materials unfortunately have not been found to be highly effective in reducing the concentration of the silicon mu-oxide impurities to the very low levels, e.g., below about 0.1 parts per million (ppm), which are required for the fabrication of satisfactory semiconductor products.

Dichlorosilane may be purified by distillation, but such method is generally equipment-intensive, time-consuming, and expensive.

When water is present as an impurity in the dichlorosilane gas stream, hydrolysis of dichlorosilane may occur, producing hydrogen chloride as a further impurity in the gas stream. This production of hydrogen chloride is however not generally considered critical, except for the fact that metallic components in the process system may be subjected to corrosive action if the hydrogen chloride is accompanied by the presence of water.

Thus, water and silicon mu-oxides are considered to be the critical impurities in dichlorosilane for purposes of its usage as a silicon source reagent in semiconductor manufacturing operations.

It therefore is an object of the present invention to provide a composition, process, and apparatus for the efficient removal of water and silicon mu-oxides from dichlorosilane, to produce a purified dichlorosilane product which is of a suitable purity for semiconductor manufacturing operations.

Other objects and advantages of the present invention will be more fully apparent from the ensuing disclosure and appended claims.

SUMMARY OF THE INVENTION

In one aspect, the present invention relates to a scavenger composition having utility for removal of water and/or silicon mu-oxide impurities from chlorosilanes, such scavenger composition comprising:

(a) a support; and (b) associated with said support, one or more compound(s) selected from the group consisting of compounds of the formula:

$$R_{a-x}MCl_x$$

wherein:

M is a metal selected from the group consisting of lithium, sodium, potassium, magnesium, strontium, barium, calcium, and aluminum;

R is alkyl;

a is a number equal to the valency of metal M; and x is a number having a value of from 0 to a, inclusive; and wherein said compound(s) of the formula $R_{a-x}MCl_x$ have been activated for impurity removal service by a reaction scheme selected from those of the group consisting of:

(i) reaction of said compound(s) with hydrogen chloride to form a first reaction product therefrom, followed by reaction of such first reaction product with a chlorosilane of the formula:

$SiH_{4-y}Cl_y$, wherein y is a number having a value of from 1 to 3, inclusive; and (ii) reaction of said compound(s) with a chlorosilane of the formula:

$SiH_{4-y}Cl_y$ wherein y is a number having a value of from 1 to 3, inclusive.

In another aspect, the invention relates to a process for removing water and/or silicon mu-oxide impurities from a chlorosilane, comprising:

contacting the impurity-containing chlorosilane with a scavenger composition which comprises:

(a) a support; and (b) associated with said support, one or more compound(s) selected from the group consisting of compounds of the formula:

$R_{a-x}MCl_x$ wherein:

M is a metal selected from the group consisting of lithium, sodium, potassium, magnesium, strontium, barium, calcium, and aluminum;

R is alkyl;

a is a number equal to the valency of metal M; and x is a number having a value of from 0 to a, inclusive; and wherein said compound(s) of the formula $R_{a-x}MCl_x$ have been activated for impurity removal service by a reaction scheme selected from those of the group consisting of:

(i) reaction of said compound(s) with hydrogen chloride to form a first reaction product therefrom followed by reaction of such first reaction product with a chlorosilane of the formula:

$SiH_{4-y}Cl_y$, wherein y is a number having a value of from 1 to 3, inclusive; and (ii) reaction of said compound(s) with a chlorosilane of the formula:

$SiH_{4-y}Cl_y$ wherein y is a number having a value of from 1 to 3, inclusive.

The invention in yet another aspect relates to an apparatus for removing water and/or silicon mu-oxide impurities from chlorosilane, comprising:

(a) a vessel containing a bed of the scavenger composition which is described hereinabove;

(b) means for introducing the impurity-containing chlorosilane to the vessel for passage through the bed therein; and (c) means for discharging impurity-depleted chlorosilane from the vessel.

As used herein, the term "chlorosilane(s)" refers to chlorosilane compound(s) of the formula $SiH_{4-y}Cl_y$ where y is a number having a value of from 1 to 3, inclusive.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
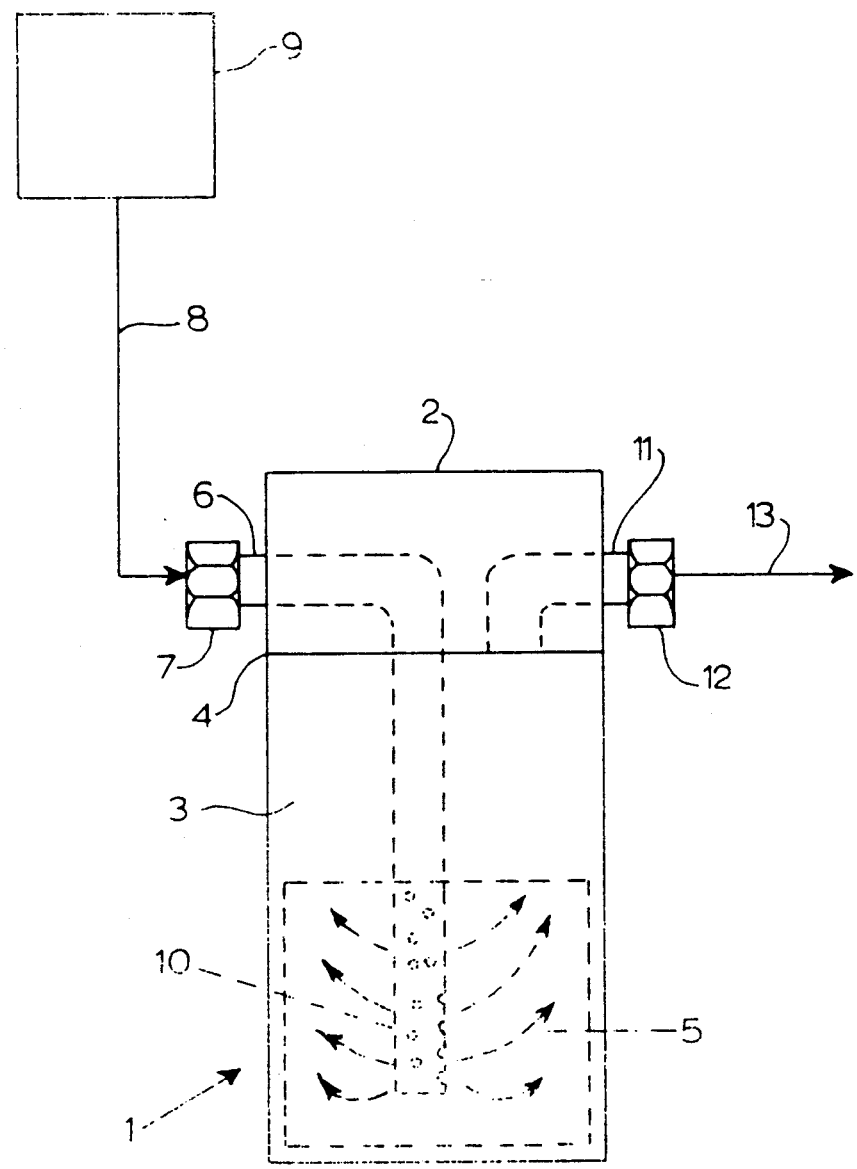
FIG. 1 is a schematic representation of a vessel containing a bed of a scavenger composition according to one embodiment of the present invention, and an associated source of dichlorosilane containing water and/or silicon mu-oxide impurities which is purified by passage thereof through the vessel for contacting with the bed of scavenger composition therein.

The scavenger composition of the present invention comprises:

(a) a support; and (b) associated with the support, one or more compound(s) selected from the group consisting of compounds of the formula:

$R_{a-x}MCl_x$ wherein:

M is a metal selected from the group consisting of the monovalent metals lithium, sodium, and potassium; the divalent metals magnesium, strontium, barium, and calcium; and the trivalent metal aluminum;

R is alkyl;

a is a number equal to the valency of metal M; and x is a number having a value of from 0 to a, inclusive.

wherein said compound(s) of the formula $R_{a-x}MCl_x$ have been activated for impurity removal service by a reaction scheme selected from those of the group consisting of:

(i) reaction of said compound(s) with hydrogen chloride to form a first reaction product therefrom, followed by reaction of such first reaction product with a chlorosilane of the formula:

$SiH_{4-y}Cl_y$ wherein y is a number having a value of from 1 to 3, inclusive; and (ii) reaction of said compound(s) with a chlorosilane of the formula:

$SiH_{4-y}Cl_y$ wherein y is a number having a value of from 1 to 3, inclusive.

It has been discovered that scavenger compositions of the above-described type are surprisingly and unexpectedly efficient in removing water and/or silicon mu-oxides from chlorosilanes, such as dichlorosilane, which contain such impurities.

In the scavenger compositions of the invention, the active scavenger compound(s) are associated with the support. The association of the active scavenger compound(s) with the support or substrate material may be effected in any suitable manner. For example, the active scavenger compound(s) may be chemically bonded to the support, such as by covalent or ionic bonding. Alternatively, the active scavenger compound(s) may be physically associated with the support. For example, the active scavenging species may be dispersed throughout the support matrix in the form of particulates or agglomerates, deposited as a film or plating on the support, or otherwise localized in the pores of a porous support. The support material, and the form of the active scavenging species and its disposition on the substrate, may be varied widely depending on the specific active scavenging species and the purification application involved.

The supports useful in the scavenger compositions of the present invention include any suitable materials which are compatible with and inert to the gas being purified, the reaction products of the impurity removal, and any intermediates involved with conditioning or otherwise preparing the scavenger, and which are stable under the conditions of use. The support should have sufficiently high temperature and chemical stability and porosity characteristics. The stability criteria are important for maintaining the integrity of the scavenger composition during its synthesis and with the reagents utilized during the synthesis and in the chlorosilane gas stream in use. The maximum temperatures that are likely to be encountered are in the range of 200° C. to 300° C. The reagents employed in the synthesis operation are likely to be strongly reducing in character. The support typically must be stable to both strongly acidic and strongly basic reagents.

Illustrative materials which may be potentially useful in the broad practice of the invention include materials such as auminosilicates, alumina, silica, kieselguhr, activated carbon, metal fluorides, and fluorocarbon polymers. As used herein, the term "aluminosilicates" means a support composition including the elements aluminum, silicon, and oxygen, such as molecular sieves; such aluminosilicates may be natural or synthetic in character.

The preferred characteristics of supports which are useful for scavenger compositions of the invention include (a) high surface area, for example a surface area in the range of from about 50 to about 1000 square meters per gram of support, (b) high porosity, such as a significant porosity from pores of a diameter in the range of from about 3 to about 200 Angstroms, and (c) good thermal stability, e.g., thermally stable at temperatures up to about 300 degrees Centigrade.

The scavenger composition of the invention may be readily formed into a bed through which gas is flowed thereby providing a highly efficient removal system for substantially eliminating water and silicon mu-oxides from chlorosilanes.

The capacity of the bed for removing water and silicon mu-oxides may of course be readily adjusted to a particular desired level by controlling the loading of the active scavenging moiety on the support, in the impregnation or other fabrication step by which the active scavenging species is applied to the support.

Preferred supports in the broad practice of the invention include aluminas, silicas, molecular sieves, and other aluminosilicates.

Thus, the active scavenging compound(s) may readily be disposed on the support material by chemical reaction or physical association, depending on the nature of the active scavenging compounds and the specific support materials employed, as described for example in prior copending application U.S. Ser. No. 07/029,631 filed Mar. 24, 1987, issued on Aug. 1, 1989 and U.S. Pat. No. 4,853,148 the disclosure of which hereby is incorporated herein by reference.

The active scavenging compound(s) useful in the scavenger composition of the present invention include those of the formula:

$R_{a-x}MCl_x$, wherein:
R is alkyl;
M is a metal selected from the group consisting of the monovalent Group I metals lithium, sodium, and potassium; the divalent Group II metals magnesium, barium, strontium and calcium; and the trivalent Group III metal aluminum;
a is a number having a value equal to the valency of metal M in the active compound, i.e., a value of from 1 to 3, inclusive; and
x is a number having value of from 0 to a, inclusive;
wherein such compound(s) have been subjected activation reaction treatment, as described more fully hereinafter.

As used herein, the term "alkyl" is inclusive of hydrocarbyl alkyl species per se, as well as alkyl groups substituted with any other substituents which do not preclude the efficacy of the active scavenging compound(s) for their intended purpose.

Preferred divalent metal active scavenging compound(s) include those of the formula:

$R_{2-x}MCl_x$, wherein:
R is alkyl;
M is magnesium, calcium, strontium, or barium; and
x is a number having a value of from 0 to 1, inclusive;
wherein such active scavenging compound(s) have been subjected to activation reaction treatment, as described hereinafter.

Preferred trivalent metal active scavenging compound(s) according to the present invention include those of the formula:

$R_{3-x}AlCl_x$, wherein:
R is alkyl;
x is a number having a value of from 0 to 2, inclusive; and
wherein such active scavenging compound(s) have been subjected to activation reaction treatment, as described below.

The above-described active scavenging compound(s) are activated for use, to remove water and/or silicon mu-oxides from chlorosilanes contacted therewith, by an activation reaction process selected from one of the following two reaction scheme categories:

(1) the active scavenging compound is reacted with hydrogen chloride to form a first reaction product, and this first reaction product is then reacted with a chlorosilane of the formula $SiH_{r-y}Cl_y$, wherein y is a number having a value of from 1 to 3, inclusive; or (2) the active scavenging compound is reacted with a chlorosilane of the formula $SiH_{4-y}Cl_y$, wherein y is a number having a value of from 1 to 3, inclusive.

Thus, the active scavenging compound(s) are activated by reaction with a chlorosilane compound, optionally with a prior reaction with hydrogen chloride. The activation reaction scheme including a first reaction with hydrogen chloride is particularly advantageous when the active scavenging species initially deposited on the support is an alkylmetal compound, as compared with active scavenging compound(s) which are already chlorinated, i.e., those compounds wherein x in the formula:

is greater than 0. Nonetheless, even where the active scavenging compound(s) deposited on the support already are partially chlorinated, such pretreatment with hydrogen chloride may be advantageous to further chlorinate the compound(s). The determination of whether such first reaction treatment with hydrogen chloride is advantageous may readily be made by simple comparative tests of hydrogen chloride-reacted and hydrogen chloride un-reacted active scavenging compounds in purification service.

Regardless of whether a first activation reaction step of reaction with hydrogen chloride is carried out, the active scavenging compound(s) are reacted with a chlorosilane of the formula:

wherein y is a number having a value of from 1 to 3, inclusive. It is to be understood that the chlorosilane reactant may be a mixture of different chlorosilane compounds of such general formula, as well as a single chlorosilane compound of such type.

The activation reaction of the active scavenging species with the chlorosilane compound is an equilibration reaction which must be carried out in order for the scavenger composition to be effective. During this equilibration reaction, a large extent of disproportionation occurs, as a result of which the metal halogen scavenging compound is chemically modified.

Consistent with the foregoing, the scavenging compound(s) initially deposited on the support may be activated, by activation reaction treatment as above described, in a widely varying manner, with respect to the relative proportions of the respective reactants, and the activation reaction conditions, depending on the specific active scavenging compound(s) and support materials employed. Suitable reactant proportions and reactant conditions may readily be determined by those skilled in the art, without the necessity of undue experimentation, to obtain a scavenger composition in accordance with the present invention which is suitable for a specific chlorosilane purification end use application.

In use, scavenger compositions of the invention can efficiently remove water from chlorosilanes down to part-per-million levels by reaction of the (activated) active scavenging species with the water impurity, to form as reaction product tightly bound metal chloride hydrates, which may in turn hydrolyze to form metal oxides. In any event, the water is effectively removed by the scavenger composition to produce purified chlorosilane having only parts-per-million residual concentrations of water.

Concurrently, the scavenger composition in contact with impurity-containing chlorosilane reacts with any silicon micro-oxide impurities therein, with the metal chloride in the active scavenging species exchanging its chlorine moiety for oxygen atoms from the silicon mu-oxide impurities. This substitution reaction has a small heat of reaction, but is thermodynamically favorable.

It will be apparent from the foregoing description that the active scavenging compound(s) on the scavenger composition may be activated in situ in the process system, by equilibration disproportionation reaction with chlorosilane, to render the scavenger composition capable of subsequent reactive removal of water and silicon mu-oxide impurities from the chlorosilane being purified. Alternatively, such chlorosilane activation reaction may be carried out prior to introduction of the scavenger composition into the gas purification system, so that the scavenger composition is pre-activated at the time of its installation in the process system.

The scavenger composition may suitably be provided in the form of pellets or other particulate form, whereby it may be employed to form a bed of the scavenger composition in a suitable containment vessel, through which the impurity-containing chlorosilane stream is flowed for purification contacting with the scavenger composition.

Such containment vessel may for example be of the type disclosed and claimed in U.S. Pat. Nos. 4,723,967 and 4,738,693, or of any other form, structure,, or configuration suitable to the specific dichlorosilane purification application in which the scavenger composition is to be employed.

FIG. 1 shows a schematic representation of a gas purification apparatus which may be usefully employed for the removal of water and silicon mu-oxide impurities from gaseous dichlorosilane, in accordance with the present invention.

The vessel 10 shown in the drawing comprises an upper cylindrical block 12 which is leak-tightly secured to a lower cup-like receptacle 14 by means of the circumferentially extending weld 16. In the lower portion of the receptacle 14 is disposed a bed 18 of a scavenger composition according to the present invention.

The vessel is provided with means for introducing impurity-containing dichlorosilane into the vessel for contact therein with the scavenger bed 18, such means comprising inlet conduit 20 which is provided at its exterior end with a suitable fitting 22 for coupling with a feed line 32 from impurity-containing dichlorosilane source means 30.

As shown, inlet conduit 20 extends generally horizontally through the block 12 toward the center thereof, and extends downwardly from such center portion of the block into the lower part of the receptacle 14, whereby the lower portion of the conduit is in contact with the scavenger bed 18. This lower portion of inlet conduit 20 is provided with a plurality of perforation openings 34, by means of which the impurity-containing dichlorosilane entering the vessel in the inlet conduit is flowed outwardly and upwardly through the scavenger bed, with the water and/or silicon mu-oxides therein being removed as hereinabove described.

The resulting impurity-depleted dichlorosilane emerging from the bed is collected in the space above it, and flows in discharge conduit 24, provided with connecting fitting 26 at its outer end, into effluent line 28, for flow to downstream end-use facilities or further processing, as desired.

The features and advantages of the present invention are more fully shown with reference to the following non-limiting examples, wherein all parts and percentages are by weight, unless otherwise expressly stated.

EXAMPLE I

Synthesis of Magnesium Chloride-Based Scavenger Composition

A 1,000 milliliter sample of alumina (activated, neutral, Brockmann I, standard grade), having a particle size of approximately 150 mesh, an average pore size of 58 Angstroms, and a BET surface area of 155 square meters per gram, was heated to a temperature of 350° C. and such temperature was maintained for four days under a nitrogen atmosphere in a round bottom flask sealed with a rubber septum. After, such heating, the alumina was cooled under a stream of nitrogen and then transferred under nitrogen atmosphere into a nitrogen atmosphere glove box. A 400 milliliter aliquot of this material was placed in a 1,000 milliliter Wheaton bottle equipped with a butyl rubber septum, and 237 grams of a 3 weight percent magnesium solution of dibutylmagnesium in hexane was added. Most of the hexane was removed under a stream of nitrogen at 100° C., following which the temperature of the bed was raised to 120° C. to remove the remaining hexane.

The vessel containing the alumina functionalized with butylmagnesium was next placed in a nitrogen atmosphere glove box, following which 300 milliliters of the functionalized material was placed in a purifier vessel, of the general type shown and described with reference to FIG. 1 hereof. A 10% hydrogen chloride in argon gas mixture was flowed through the bed of functionalized material in the purifier vessel, at a rate of 1 liter per minute, until the outlet concentration of gas from the purifier vessel reached 10% hydrogen chloride. The exit gases from the purifier vessel were scrubbed with a caustic solution of sodium bicarbonate. The bed of functionalized material was then sparged by passage of nitrogen therethrough until hydrogen chloride could not be detected in the exit gas stream.

A first volume of 1% dichlorosilane in argon was passed through the bed in the purifier apparatus until chlorinated silicon compounds were detected in the exit stream. During this equilibration step, a large extend of disproportionation occurred, indicating that the original magnesium chloride material was chemically modified. Another volume of 1% dichlorosilane in argon, substantially equal to the first volume, was passed through the bed in the purifier apparatus. Nitrogen or argon then was used to flush the excess dichlorosilane mixture from the bed.

EXAMPLE II

Synthesis of Magnesium Chloride-Based Dichlorosilane Scavenger Composition, Without Hydrogen Chloride Pretreatment A 1,000 milliliter sample of alumina, of the same type employed in Example I, was heated to a temperature of 350° C. and such temperature was maintained for four days under a nitrogen atmosphere in a round bottom flask sealed with a rubber septum. The alumina then was cooled under a stream of nitrogen and transferred under nitrogen atmosphere into a nitrogen atmosphere glove box. A 400 milliliter aliquot of this material was placed in 1,000 milliliter Wheaton bottle equipped with a butyl rubber septum, and 237 grams of a 3 weight percent magnesium solution of dibutylmagnesium in hexane was added. Most of the hexane was removed under a stream of nitrogen at 100° C., following which the temperature of the bed was raised to 120° C. to remove the remaining hexane.

The reaction vessel containing the functional alumina was next placed in a nitrogen atmosphere glove box, and 300 milliliters of such material was placed into a purifier vessel of the general type shown and described with reference to FIG. 1 hereof.

A first volume of 1% dichlorosilane in argon was flowed through the bed of functionalized material in the purifier vessel until the outlet concentration of dichlorosilane reached 1%. A second volume of 1% dichlorosilane in argon, having a volume substantially equal to the first volume, was then passed through the bed in the purifier vessel, and nitrogen or argon was used to flush the excess dichlorosilane mixture from the bed.

EXAMPLE III

Synthesis of Aluminum Chloride-Based Scavenger Composition

A 1,000 milliliter sample of alumina, of the same type employed in Examples I and II, was heated to a temperature of 350° C. and such temperature was maintained for four days under nitrogen atmosphere in a round bottom flask sealed with a stream of nitrogen rubber septum. The alumina was cooled under a stream of nitrogen and then transferred under nitrogen atmosphere to a atmosphere glove box. A 400 milliliter aliquot of this material was placed in a 1,000 milliliter Wheaton bottle equipped with a butyl rubber septum, and 400 milliliters of 1.0 Molar triethylaluminum in hexane was added. Most of the hexane was removed under a stream of nitrogen at 100° C., following which the temperature of the bed was raised to 120° C. to remove the remaining hexane.

The reaction vessel containing the functionalized alumina was next placed in a nitrogen glove box, and 300 milliliters of the functionalized material was placed into a purifier vessel of the general type shown and described with reference to FIG. 1 hereof. A first volume of 1% dichlorosilane in argon was flowed through the bed in the purifier vessel until a concentration of dichlorosilane in the exit gas of 1% was reached. During this equilibration step, a large extent of disproportionation occurred, indicating that the original aluminum chloride deposited on the alumina support was chemically modified. A second volume of 1% dichlorosilane in argon, substantially equal to the first volume, was then passed through the bed in the purifier vessel, and nitrogen or argon was used to flush the excess dichlorosilane gas mixture from the bed.

EXAMPLE IV

Removal of Oxygenated Species by Aluminum Chloride-Based Scavenger Composition A series of synthetic impurity-containing gas mixtures was made up by adding aliquots of air to 1%, 5%, and 100% dichlorosilane (balance helium) samples. Approximately six air concentrations were employed with each dichlorosilane concentration, to provide a large variety of gas mixtures for analysis. These impurity-containing gas mixtures were examined by capillary gas chromatrography/mass spectroscopy (GC/MS) using a Hewlett Packard 5890 GC with a 5970 mass selective detector.

Figure 2:
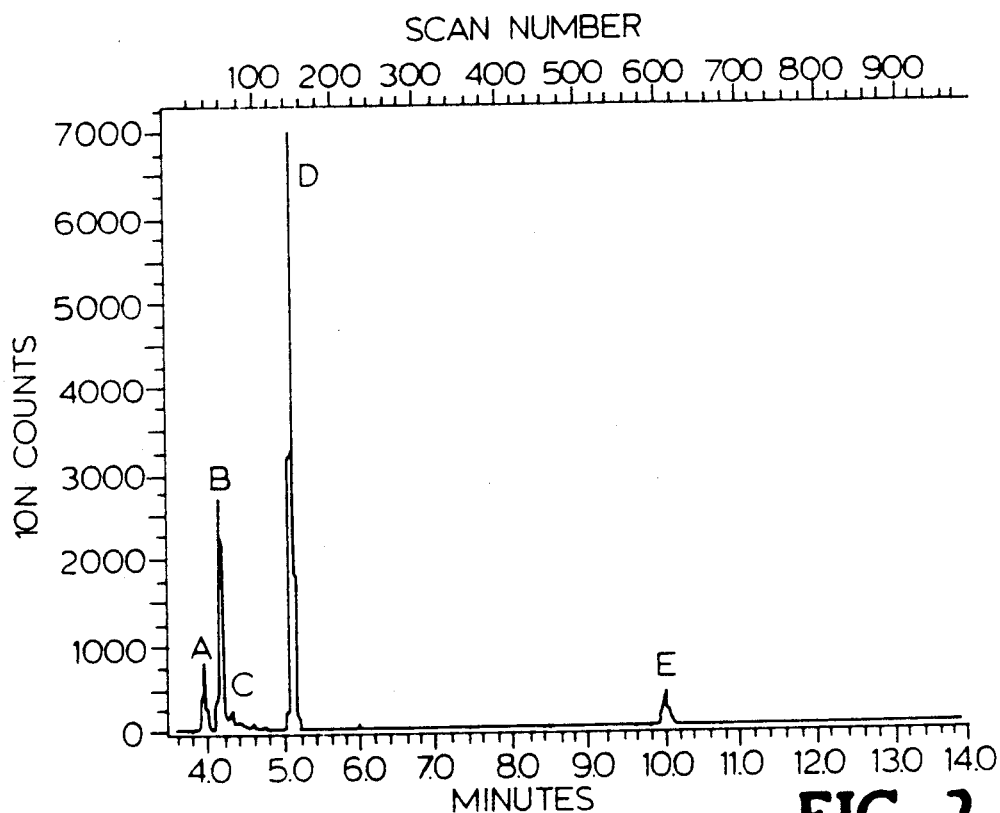
FIG. 2 is a chromatogram of an impurity-containing dichlorosilane gas sample.

Results of this analysis for a typical gas mixture sample are shown in FIG. 2, wherein the various labeled peaks include carrier gas nitrogen (peak A), hydrogen chloride (peak B), monochlorosilane (peak C), dichlorosilane (peak D), and the tetramer $Si_4H_4O_4$ (peak E).

A corresponding sample of the same impurity-containing gas mixture was fowed through a bed of a scavenger composition comprising aluminum chloride on an alumina support. The scavenger composition was prepared in accordance with Example III and equilibrated with dichlorosilane before passage of the impurity-containing gas mixture therethrough. The purifier bed had an aspect ratio (length/diameter) of 15. The space velocity of the impurity-containing gas mixture flowed through the purifier bed was 1050 $hr^{-1}$ (1050 volumes of gas mixture per volume of bed per hour), and the temperature of the impurity-containing gas mixture was 25° C.

Figure 3:
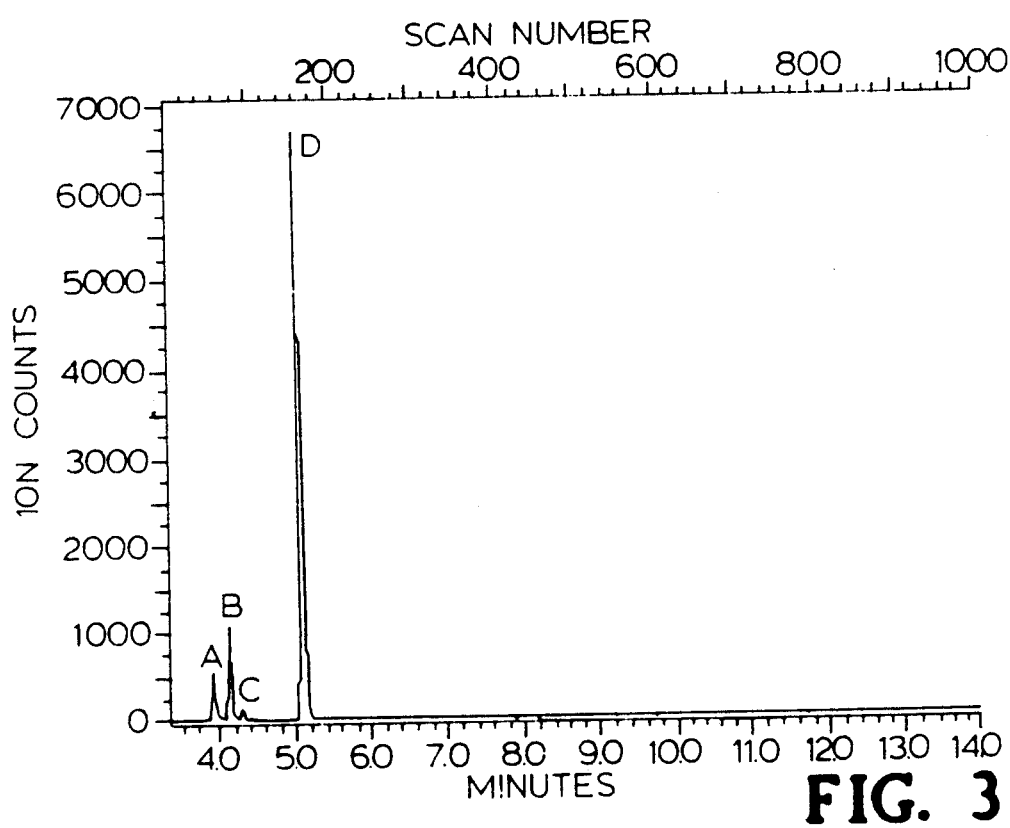
FIG. 3 is a chromatogram of an impurity-depleted dichlorosilane gas sample produced by purification treatment of impurity-containing dichlorosilane by a scavenger composition of the present invention.

The impurity-containing gas mixture passed through the scavenger composition bed was then subjected to GC/MS analysis, and a chromatogram of the exit gas mixture is shown in FIG. 3. A comparison of the respective chromatograms of FIGS. 2 and 3, shows that the oxygenated species peak (peak E) in FIG. 2 is absent from the FIG. 3 chromatogram, indicating that the oxygenated species have been removed by the scavenger composition. The concentration of tetramer in the impurity-containing gas was reduced from 20 ppm to less than 0.1 ppm by contact with the scavenger composition.

EXAMPLE V

Removal of Oxygenated Species With Celite ® Filter Media

A gas mixture containing 1% dichlorosilane was prepared as in Example IV. This gas mixture was passed through a column containing activated Celite ® filter media, which was activated by calcining at 400° C. in vacuo for 18 hours. The concentration of mu-oxides in the dichlorosilane feed gas mixture was virtually unaffected by contacting with such filter medium.

Although the composition, process, and apparatus of the present invention have been described with particular reference to the purification treatment of dichlorosilane, it will be appreciated that same may be employed for the purification treatment of other chlorosilane compounds, including chlorosilanes of the general formula $SiH_{4-y}Cl_y$, wherein y is a number having a value of 1 to 3, inclusive.

Thus, while the invention has been shown and described with reference to specific aspects and embodiments thereof, it will be apparent that numerous variations, modifications, and other embodiments are possible, and accordingly all such modifications, variations, and embodiments are to be regarded as being within the spirit and scope of the invention.

What is claimed is:

1. A scavenger composition having utility for removal of water and silicon mu-oxide impurities from gaseous chlorosilanes, said scavenger composition consisting essentially of:
   (a) an inert inorganic support characterized by (i) a BET surface area of from about 30 to about 1,000 square meters per gram of support, (ii) a significant porosity from pores of a diameter in the range of from about 3 to about 200 Angstroms, and (iii) being thermally stable at temperatures up to about 300° C. Centigrade; and
   (b) associated with said support, active scavenging compound(s) constituted by the reaction product resulting from:
      (1) the loading of one or more compound(s) onto the inert organic support, at a loading of from about 1 to about 5 moles per liter of a bed of the scavenger, wherein said compound(s) are selected from the group consisting of compound(s) of the formula:

$R_{a-x}MCl_x$ wherein:
      M is a metal selected from the group consisting of the monovalent metals lithium, sodium, and potassium and the divalent metals magnesium, strontium, barium, and calcium.
      R is alkyl
      a is a number equal to the valency of metal M; and
      x is a number having a value of from 0 to a, inclusive; and
      (2) the activation of said compound(s) by a reaction scheme selected from those of the group consisting of:
         (i) reaction of said compound(s) with hydrogen chloride to form a first reaction product therefrom, followed by reaction of said first reaction production with a chlorosilane of the formula:

$SiH_{4-y}Cl_y$ wherein y is a number having a value of from 1 to 3, inclusive; and
         (ii) reaction of said compound(s) with a chlorosilane of the formula:

$SiH_{4-y}Cl_y$ wherein y is a number having a value of from 1 to 3, inclusive.

2. A scavenger composition according to claim 1, wherein said support comprises a material selected from the group consisting of alumina, silica, aluminosilicates, kieselguhr, activated carbon, metal fluorides, and fluorocarbon polymers.

3. A scavenger composition according to claim 1, wherein said support comprises alumina.

4. A scavenger composition according to claim 1, wherein M is selected from the group consisting of magnesium, calcium, strontium, and barium.

5. A scavenger composition according to claim 1, wherein the active scavenger compound(s) comprise dibutylmagnesium.

6. A scavenger composition according to claim 1, wherein M is magnesium.

7. A scavenger composition according to claim 1, wherein x has a value of 0.

8. A method of making a scavenger composition having utility for purifying gaseous chlorosilane to remove silicon mu-oxide and water impurities therefrom, consisting essentially of:
   (a) providing an inert inorganic support characterized by (i) a BET surface area of from about 30 to about 1,000 square metals per gram of support, (ii) a significant porosity from pores of a diameter in the range of from about 3 to about 200 Angstroms, and (iii) being thermally stable at temperatures up to about 300° Centigrade;
(b) depositing on said inert inorganic support, at a loading of from about 1 to about 5 moles per liter of a bed of the scavenger, one or more compound(s) selected from the group consisting of compounds of the formula:

$$R_{a-x}MCl_x$$

wherein:
M is a metal selected from the group consisting of the monovalent metals lithium, sodium, and potassium; and the divalent metals magnesium, strontium, barium, and calcium;
is alkyl;
a is a number equal to the valency of metal M; and
x is a number having a value of from 0 to a, inclusive; and
(c) activating said compound(s) of the formula $R_{a-x}MCl_x$ for impurity removal service by a reaction scheme selected from those of the group consisting of:
  (i) reaction of said compound(s) with hydrogen chloride to form a first reaction product therefrom, followed by reaction of said first reaction product with chlorosilane of the formula:

$$SiH_{4-y}Cl_y,$$

wherein y is a number having a value of from 1 to 3, inclusive; and
  (ii) reaction of said compound(s) with a chlorosilane of the formula:

$$SiH_{4-y}Cl_y$$

wherein y is a number having a value of from 1 to 3, inclusive.

9. An apparatus for removing water and silicon muoxide impurities from gaseous chlorosilanes, comprising:
(a) a vessel containing a bed of a scavenger composition consisting essentially of:
an inert inorganic support characterized by (i) a BET surface area of from about 30 to about 1,000 square meters per gram of support, (ii) a significant porosity from pores of a diameter in the range of from about 3 to about 200 Angstroms, and (iii) being thermally stable at temperatures of to about 300° Centigrade; and
associated with the inert organic support, active scavenging compound(s) constituted by the reaction product resulting from:
  (1) the loading of one or more compound(s) onto the substrate, at a loading of from about 1 to about 5 moles per liter or a bed of the scavenger, wherein said compound(s) are selected from the group consisting of compounds of the formula:

$$R_{a-x}MCl_x$$

wherein:
  M is a metal selected from the group consisting of the monovalent metal lithium, sodium, and potassium; and the divalent metals magnesium, strontium, barium, and calcium;
  R is alkyl;
  a is an number equal to the valency of metal M; and
  x is a number having a value of from 0 to a, inclusive, and
  (2) the activation of said compound(s) by a reaction scheme selected from those of the group consisting of:
    (i) reaction of said compound(s) with hydrogen chloride to form a first reaction product therefrom, followed by reaction of said first reaction product with a chlorosilane of the formula:

$$SiH_{4-y}Cl_4,$$

wherein y is a number having a value of from 1 to 3, inclusive; and
    (ii) reaction of said compound(s) with a chlorosilane of the formula:

$$SiH_{4-y}Cl_y$$

wherein y is a number having a value of from 1 to 3, inclusive;
(b) means for introducing impurity-containing gaseous chlorosilane to the vessel for passage through the bed therein; and
(c) means for discharging impurity-depleted gaseous chlorosilane from the vessel.

* * * * *

UNITED STATES PATENT AND TRADEMARK OFFICE
CERTIFICATE OF CORRECTION

PATENT NO.  : 5,057,242

DATED       : October 15, 1991

INVENTOR(S) : Glenn M. Tom & James V. McManus

It is certified that error appears in the above-identified patent and that said Letters Patent is hereby corrected as shown below:

Column 1, line 34, change "usable" to --usage--.
Column 5, line 36, change "auminosilicates" to --aluminosilicates--.
Column 6, line 23, after "subjected", insert --to--.
Column 6, line 62, change "SiH$_{r-y}$Cl$_y$" to --SiH$_{4-y}$Cl$_y$--.
Column 9, line 42, change "extend" to --extent--.
Column 11, line 6, change "fowed" to --flowed--.

Signed and Sealed this

Second Day of March, 1993

Attest:

STEPHEN G. KUNIN

*Attesting Officer*     Acting Commissioner of Patents and Trademarks